Jan. 25, 1966  A. M. GRASSE  3,231,088
SHAKER CONVEYING AND SCREENING SYSTEM
Filed Nov. 8, 1962  3 Sheets-Sheet 1
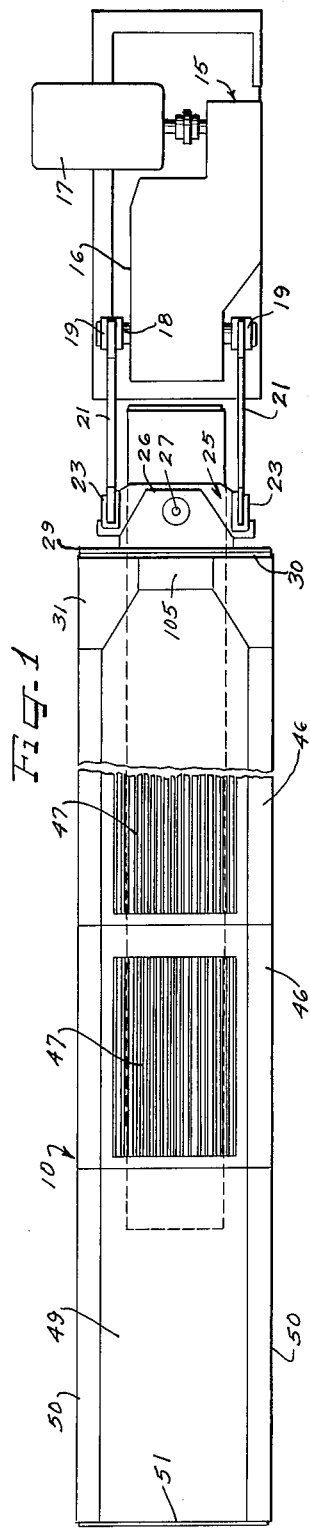
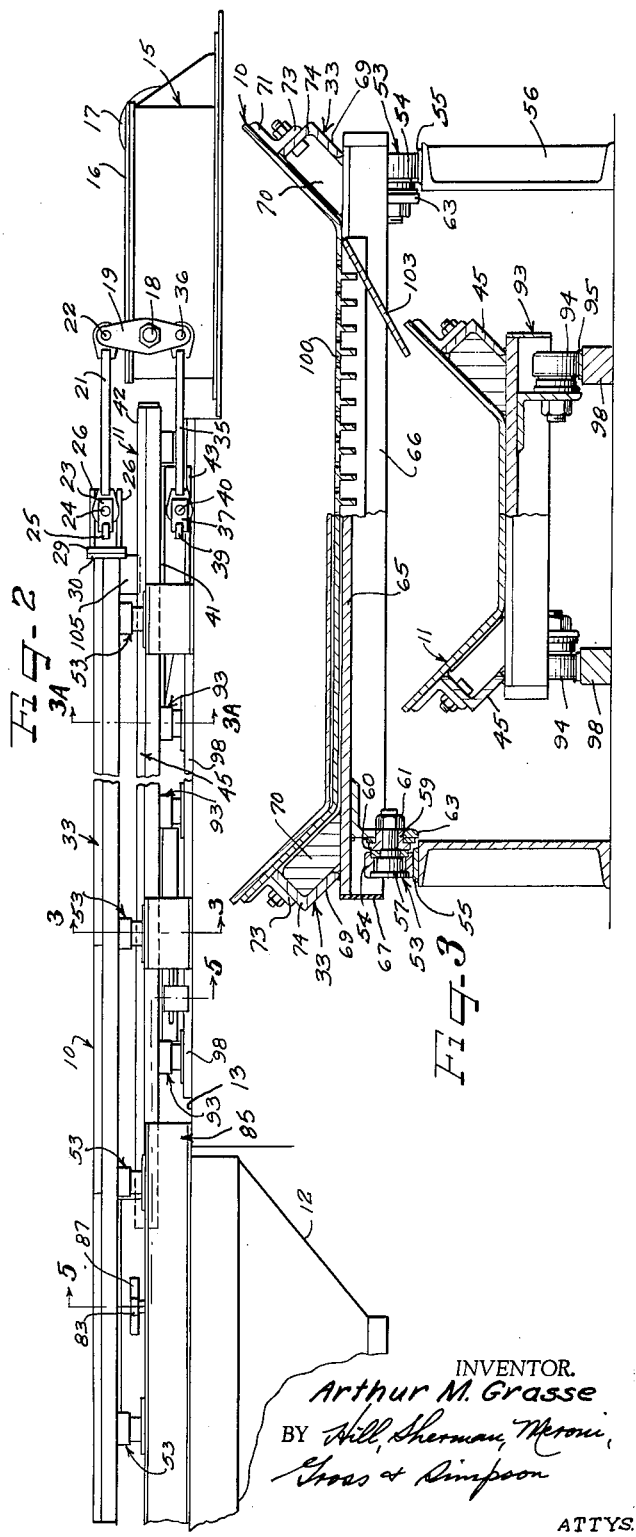
INVENTOR.
Arthur M. Grasse
BY Hill, Sherman, Meroni,
Gross & Simpson
ATTYS.

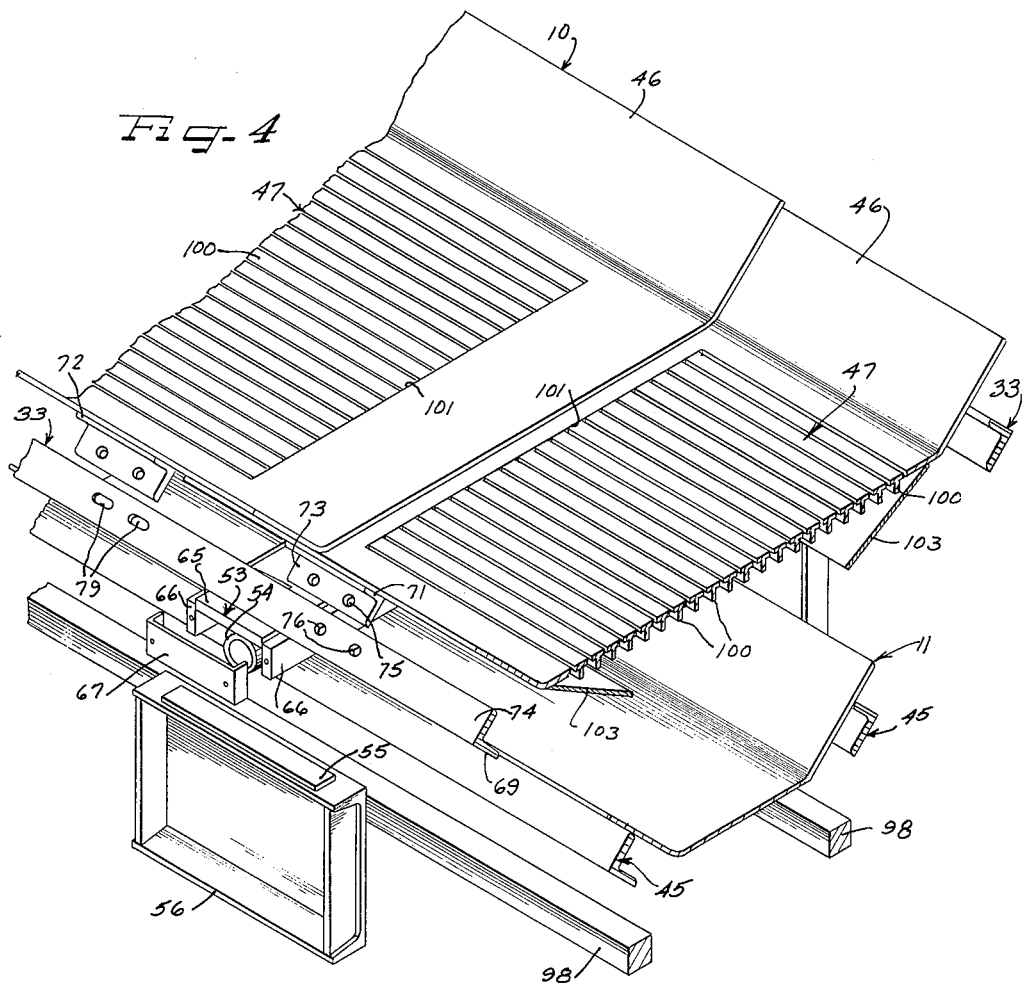

Jan. 25, 1966  A. M. GRASSE  3,231,088
SHAKER CONVEYING AND SCREENING SYSTEM
Filed Nov. 8, 1962  3 Sheets-Sheet 3
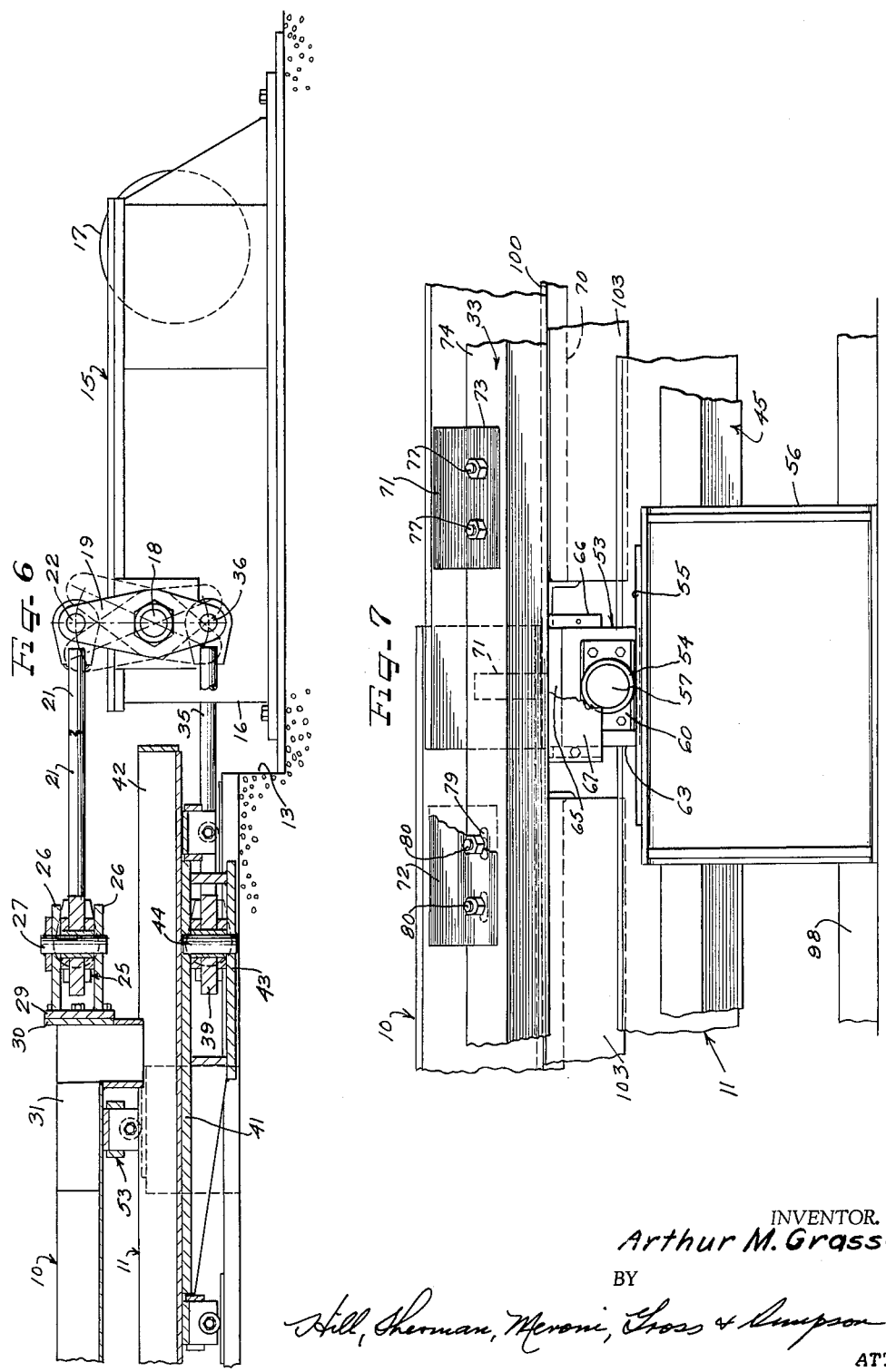
INVENTOR.
Arthur M. Grasse
BY
ATTYS.

() # United States Patent Office 3,231,088
Patented Jan. 25, 1966

3,231,088
SHAKER CONVEYING AND SCREENING SYSTEM
Arthur M. Grasse, Oak Lawn, Ill., assignor to Goodman Manufacturing Company, Chicago, Ill., a corporation of Illinois
Filed Nov. 8, 1962, Ser. No. 236,251
3 Claims. (Cl. 209—313)

This invention relates to improvements in shaker conveyors and more particularly relates to an improved form of shaker conveyor for use in conveying castings and the like and cleaning sand therefrom during the conveying operation.

A principal object of the invention is to provide an improved form of conveyor in which castings and mold flasks may be deposited onto the conveyor and conveyed to an unloading station, and in which the sand and cores removed from the castings and flasks, during the conveying operation, are screened from the conveyor and collected and conveyed for reuse.

Another object of the invention is to improve upon the shaker conveyors heretofore in use for conveying castings, mold flasks and the like by providing two aligned shaker conveyor trough lines, one beneath the other, the upper trough line of which may convey the castings and flasks to an unloading station and jog the sand from the castings and flasks and screen the sand removed from the castings and flasks, and discharge the sand onto the lower trough for discharge into a hopper for reuse.

Still another object of the invention is to provide a novel and improved drive means for a series of aligned conveyor troughs of a shaker conveyor trough line in which the drive is to the individual troughs of the trough line through thrust bars forming connecting members for the troughs.

A further object of the invention is to provide an improved form of conveyor trough for conveying heavy castings and removing sand from the castings by the jogging action of reciprocable movement of the conveyor, and screening the sand removed from the castings, to be carried away for reclaiming and storage.

A still further object of the invention is to provide an improved form of conveyor for castings and the like in which a reciprocating conveying and screening trough line is supported for reciprocable movement along an upper level, a second sand carrying trough line is supported beneath the upper trough line in vertical alignment therewith, for conveying the sand removed from the castings in an opposite direction from the direction of movement of the castings, and in which a single drive member connected to the same ends of the conveyor trough lines is provided to reciprocably drive the trough lines with opposite conveying actions.

Still another object of the invention is to provide an improved form of conecting and drive means for a shaker conveyor trough line adapted to handle hot heavy castings in which the drive forces are imparted to the trough line through parallel spaced reciprocably supported thrust beams extending along opposite sides of the trough lines and connected to the individual troughs, in which slip connections are provided between one end of each trough and the thrust bars, to accommodate expansion thereof.

These and other objects of the invention will appear from time to time as the following specification proceeds and with reference to the accompanying drawings wherein:

FIGURE 1 is a top plan view of a shaker conveying and screening system constructed in accordance with the principles of the invention;

FIGURE 2 is a view in side elevation of the conveying and screening system shown in FIGURE 1;

FIGURE 3 is a transverse sectional view taken through the shaker conveying and screening system shown in FIGURE 2, the left half of the view being taken substantially along line 3—3 of FIGURE 2, and the right half of the view being taken substantially along line 3a—3a of FIGURE 2;

FIGURE 4 is an exploded fragmentary perspective view of a portion of the conveyor, illustrating the drive connecting and supporting means for a pair of adjacent upper troughs;

FIGURE 5 is a fragmentary transverse sectional view taken substantially along line 5—5 of FIGURE 2;

FIGURE 6 is a partial fragmentary longitudinal sectional view showing the drive connection to the upper and lower troughs; and FIGURE 7 is a fragmentary view in side elevation looking at the adjacent ends of a pair of upper and lower troughs of the conveyor trough lines, with certain parts broken away in order to show certain details of the connecting means and support for the upper trough.

In the embodiment of the invention illustrated in the drawings, I have shown in FIGURES 1 and 2, a castings conveying and screening system including an upper conveying and screening trough line 10 for conveying the castings and sand in one direction, and a lower conveying trough line 11 in material receiving relation with respect to the upper conveying and screening trough line, for conveying the sand removed from the castings and the mold flasks, where the mold flasks may be dumped onto the trough line 10 along with the castings, and depositing the sand into a hopper 12, where the sand may be reclaimed for reuse.

The aligned vertically spaced trough lines 10 and 11 may be permanently mounted on a base 13, which may be a reinforced concrete base and forms a support for a shaker conveyor drive mechanism 15, mounted on said base and having driving connection with the trough lines 10 and 11, for driving said trough lines with opposite conveying actions, to effect the progression of material along one trough line in one direction and along the opposite trough line in an opposite direction.

The shaker conveyor drive mechanism 15 may be of a conventional form including a casing 16 housing a conventional shaker drive gearing and linkage (not shown) driven by a motor 17 on the outside of said casing and rockingly driving a rock shaft 18 journalled in said casing and projecting beyond opposite ends thereof. The rock shaft 18 has rocker arms 19 secured thereto intermediate their ends, the upper end portions of said rocker arms forming drive members for the upper trough line and the lower end portions of said rocker arms forming drive members for the lower trough line for driving the lower trough line to convey material in an opposite direction from the travel of material along the upper trough line.

Each rocker arm 19 has a pusher rod 21 pivotally connected to the upper end thereof on a pivot pin 22. The pusher rods 21 extend between the legs of U-shaped connectors 23 and are pivotally connected thereto on pivot pins 24 (FIGURES 1 and 2). The connectors 23 are recessed within opposite sides of a drive plate 25, extending between parallel spaced plates 26, 26 and are pivotally connected to said plates at the longitudinal center of the conveyor trough line on a vertical pivot pin 27. The plates 26 extend from a transverse vertical plate 29 abutting a closure plate 30 for the discharge end trough 31 of the conveyor trough line. The closure plate 30 abuts the ends of thrust bars 33 shown as being in the forms of angles extending along opposite sides of the trough line 10, for reciprocably driving said trough line and relieving the individual troughs of the trough line from the stresses of driving the other troughs in the trough line.

The lower arms of the rocker arms 19 are pivotally connected to pusher rods 35 on pivot pins 36. The pusher rods 35 extend between the legs of U-shaped connectors 37, mounted at opposite sides of a drive plate 39 and pivotally connected to said connectors as by pivot pins 40 (FIGURE 2). The drive plate 39 extends between a bottom plate 41 of a trough section 42 of the lower trough line 11, and a parallel plate 43, spaced beneath the bottom plate 41, and is suitably connected thereto. A pivot pin 44 connects the drive plate 39 to the plates 41 and 43.

The trough 42 of the trough line 11 is closed at its end adjacent the drive mechanism 15, and has thrust bars 45 extending along opposite sides thereof and connected thereto, for transferring the driving forces from the troughs 42 to the other troughs of the trough line, and forming a means for connecting the troughs of the trough line 11 in aligned relation with respect to each other in the same manner the troughs of the trough line 10 are driven and connected in aligned relation with respect to each other.

The trough line 10 includes the discharge trough section 31, a series of trough sections 46 having gratings 47 extending along the bottoms thereof, and a receiving trough section 49 forming a continuation of the troughs 46, and shown in FIGURE 1 as having a solid bottom. The trough 49 is shown as having inclined side walls 50 diverging from the solid bottom and as being closed at its receiving end by a closure plate 51. The other trough sections generally conform in transverse section to the trough section 49 and are connected together in overlapping relation with respect to each other through the thrust bars 33 as will hereinafter more clearly appear as this specification proceeds.

The support means for the trough line 10 includes a series of longitudinally spaced roller frames 53. Each roller frame has a pair of laterally spaced rollers 54 rollable along wear strips 55 mounted on and extending along the top flanges of parallel spaced standards 56. The standards 56 are shown as being of a channel-like form and are suitably secured to the base 13.

The rollers 54 are journalled on stub shafts 57 extending through bosses 59 of mounting blocks 60 and are secured to said bosses as by nuts 61 threaded on the inner ends of said stub shafts. The mounting blocks 60 are bolted or otherwise secured to the vertical legs of angle irons 63 extending along opposite end portions of a support plate 65 and depending therefrom and welded or otherwise secured thereto. The plates 65 have closure members 66 extending along opposite sides thereof. Closure plates 67 extend across the ends of the closure member 66 and partially enclose the rollers 54, to protect said rollers from dirt and the like.

The thrust members 33 have legs 69 extending generally parallel to the side walls of the trough sections and welded or otherwise secured at their ends to the plates 65 (FIGURE 3). The thrust members 33 extend for the entire length of the trough line 10 and extend along the outer sides of and over the tops of retainers 70 extending along opposite sides of the trough line angularly outwardly of the top surface of the plate 65 parallel to the legs 69 and side walls of the trough sections of the trough line. The members 70 thus serve as support and strengthening members for the thrust bars on the roller frames.

Angle connectors 71 and 72 are provided to connect the adjacent ends of the trough sections of the trough line 10 to the thrust bars 33 to be driven therefrom. The angle connectors 71 and 72 may be welded to the outer sides of the trough sections of the trough line to position legs 73 thereof to extend parallel to and be supported on legs 74 of the thrust bars 33. As shown in FIGURE 4, the angle connectors 71 have bolt holes 75 leading therethrough registrable with bolt holes 76 in the legs 74 of the thrust bars 33 and connected to said thrust bars as by bolts 77 (FIGURE 7). The angle connectors 72 have similar bolt holes leading therethrough registrable with elongated slots 79 leading through the legs 74 of the thrust bars 33 and secured thereto as by bolts 80. The connection just described enables one trough section to move relative to the other upon expansion of said trough section as the troughs are heated by the hot castings thereon.

The trough line 10 is guided against sidewise movement by rollers 83 on vertical shafts 84 extending through the upper flanges of channel-like standards 85 and secured thereto as by nuts 86. The rollers 83 engage wear strips 87 extending along and secured to the vertical legs of angles 88 extending downwardly from plates 89 of side guide frames 90. The rollers 83 are shown as being positioned adjacent the receiving end of the trough line along opposite sides of the trough 49, but may also be positioned adjacent the discharge end of the trough line, if desired.

The lower trough line 11 is reciprocably supported beneath the upper trough line on roller frames 93, at spaced intervals, like the roller frames 53, supporting the upper trough line. The roller frames 93 are supported on rollers 94 which ride along wear strips or tracks 95 extending along the upper sides of track bars 98, suitably mounted on the base 13.

The lower trough line is also guided by horizontal side guide rollers 96 spaced above and suitably mounted on the track bars 98 for rotation about vertical axes. The rollers 96 engage vertical wear strips 97 spaced beneath and extending along a side guide frame 99.

The thrust bars or drive angles 45 are welded or otherwise secured to the roller frames 93 and the side guide frames 99 and reciprocably drive and form connectors for the trough sections of the lower trough line 11 in a manner similar to which the trough sections of the upper trough line are driven and connected. The details of the drive and connecting means, therefore, need not be repeated herein.

The gratings 47 of the troughs 46 are shown in FIGURES 3 and 4 as being formed from a plurality of parallel spaced T bars 100 having depending stems or legs. The T bars 100 may extend across an open space 101 in each trough 46 and may be welded or otherwise secured to opposite end portions of said open space to provide a grating having an uninterrupted top surface along which the castings and flasks are progressed. Spill plates 103 extend along the edges of the bottom surface of each trough 46 and are inclined downwardly therefrom to extend over the top edges of the trough sections of the lower trough line, to effect the discharge of the sand falling through the spaces between the T bars 100 into the trough line 11, to be carried to the hopper 12 for reclaiming and reuse.

When it is desired to operate the conveyor, the motor 17 is started to drive the shaker conveyor drive mechanism 15 and effect reciprocable movement of the trough lines 10 and 11 in opposite phase relation with respect to each other to effect the movement of castings, sand and the like, along the trough line 10 from the receiving trough 49 to the discharge trough 31 and of sand along the trough line 11 from the trough 42 to the hopper 12.

Castings with the cores and sand adhering thereto may be deposited onto the receiving trough section 49, If desired and feasible, the copes and drags of the mold flasks along with the castings may be deposited on the receiving trough 49. The castings and copes and drags, where the mold flasks are also deposited on the trough line, will then be jogged or shaken back and forth, and as they shake back and forth will progress along the trough line from the trough 49 to the trough 31. This jogging action will cause the sand and cores to fall from the castings as well as the copes and drags, as the castings and copes and drags progress toward the trough 31. The sand will then drop through the spacing between the T bars 100 and be deflected by the spill plates 103 to fall onto the trough line 11 to be conveyed by said trough line to the hopper 12.

The castings may be removed from the discharge end of the trough line when they approach the trough 31 and when removed will be cleaned from sand and cores. The copes and drags will also be cleaned when they reach the trough 31, where deposited on the trough line with the castings. Any sand or cores failing to drop through the gratings 47 will be conveyed along the trough, to a discharge chute 105 leading from the bottom of the trough 31 at the extreme discharge end thereof and will drop therethrough onto the trough line 11, to be conveyed to the hopper 12 for reclaiming and reuse.

It may be seen from the foregoing that a simple and rugged shaker conveyor drive mechanism has been provided which not only conveys hot castings to a discharge station, but also jogs the sand and cores from the castings during the conveying operation and conveys the sand jogged from the castings to a hopper for reclaiming and storage in a simple operation effected by operation of a single drive mechanism having direct driving connection with upper and lower trough lines.

It should also be noted that since the rocker arms 19 are mounted on the rock shaft 18, eccentric of their centers and since the longer rocker arms drive the trough line 10 and the shorter rocker arms drive the lower capacity trough line 11, that the trough line 10 carrying the greater load will be driven with a greater conveying action than the trough line 11, and that the conveying forces imparted to the two trough lines may readily be varied by varying the lengths of the lever arms of the driving rocker arms.

It may further be seen that the cleaning and conveying mechanism is of a rugged construction accommodating expansion of the trough sections, caused by the heat of the castings thereon, and driving the trough sections through thrust bars extending for the length of the trough line, to thereby free the individual troughs from the loads of pushing and pulling the entire trough line.

While I have herein shown and described one form in which my invention may be embodied, it may readily be understood that various variations and modifications in the invention may be attained without departing from the spirit and scope of the novel concepts thereof.

I claim as my invention:

1. A conveying and cleaning system for hot castings and the like comprising, a first reciprocating trough line guided for reciprocal movement generally parallel to the ground at a level spaced above the ground and including a solid bottom receiving trough section and a plurality of connected trough sections spaced in advance of said receiving trough section and having gratings extending along the bottoms thereof, a second conveyor trough line disposed beneath said first conveyor trough line in material receiving relation with respect to said gratings and extending generally parallel to said first conveyor trough line, a shaker conveyor drive mechanism including a casing fixedly secured to the ground, a rock shaft journalled in said casing and extending beyond opposite sides thereof, a separate double ended rocker arm mounted intermediate its ends on each end of said rock shaft and rockably driven thereby, a pair of parallel spaced pusher rods mounted on opposite ends of each rocker arm and extending generally parallel to the paths of travel of said trough lines, an end plate closing the end of said first conveyor trough line adjacent said shaker conveyor drive mechanism, drive connections from the upper of said pusher rods to said end plate, drive connections from the lower of said pusher rods to said second conveyor trough line along the bottom thereof and thrust bars extending along opposite sides of said trough lines, the thrust bars extending along the first trough line abutting the end plate therefor and reciprocably driven thereby, the second of said trough lines having a closure plate extending across the end thereof adjacent said shaker conveyor drive mechanism and the thrust bars extending along the second of said trough lines abutting said closure plate and reciprocably driven therefrom, and slip connections between the troughs of said trough lines and said thrust bars accommodating expansible and contractible movement of said trough sections with respect to each other.

2. A conveying and cleaning system for hot castings and the like comprising, a first reciprocating trough line guided for reciprocal movement generally parallel to the ground at a level spaced above the ground and including a solid bottom receiving trough section and a plurality of aligned connected trough sections connected to said receiving trough section and extending in advance thereof and each having gratings extending along the bottoms thereof, a second reciprocating trough line disposed beneath said first trough line in material receiving relation with respect to said grating and extending generally parallel to said first trough line, a shaker conveyor drive mechanism including a casing fixedly secured to the ground, a rock shaft journalled in said casing, a double ended rocker arm mounted on said rock shaft intermediate its ends and rockably driven thereby, two vertically spaced generally parallel push rods pivotally connected to opposite ends of said rocker arm and having driving connection with said troughs along median lines of action substantially parallel to the directions of travel of said troughs, roller supports for said first and second trough lines including rollers movable along parallel horizontal supports, and slip connections between said troughs of said first and second trough lines, accommodating expansible and contractible movement of said troughs with respect to each other upon changes in temperature.

3. A conveying and cleaning system for hot castings and the like comprising, a first reciprocating trough line guided for reciprocal movement generally parallel to the ground at a level spaced above the ground and including a solid bottom receiving trough section and a plurality of aligned connected trough sections connected to said receiving trough section and extending in advance thereof and each having gratings extending along the bottoms thereof, a second reciprocating trough line disposed beneath said first trough line in material receiving relation with respect to said gratings and extending generally parallel to said first trough line, a shaker conveyor drive mechanism including a casing fixedly secured to the ground, a rock shaft journalled in said casing, a double ended rocker arm mounted on said rock shaft intermediate its ends and rockably driven thereby, two vertically spaced generally parallel push rods pivotally connected to opposite ends of said rocker arm and having driving connection with said troughs along median lines of action substantially parallel to the directions of travel of said troughs, and the connected trough sections of the first reciprocating trough line having rectangular openings in the bottoms thereof and having a plurality of spaced T-shaped grate bars having depending legs extending along said openings and having top surfaces on the planes of the bottoms of said troughs and extending along said openings and secured to said troughs along the forward and rear margins of said openings to form open gratings and stiffeners for said troughs.

(References on following page)

References Cited by the Examiner

UNITED STATES PATENTS

| | | | |
|---|---|---|---|
| 639,710 | 12/1899 | Cherry | 209—342 |
| 1,455,336 | 5/1923 | Jacobsen | 209—342 |
| 1,534,892 | 4/1925 | Beaumont | 209—315 |
| 1,955,153 | 3/1934 | Sloane | 198—220 |
| 2,279,742 | 3/1942 | Overstrom | 209—315 |
| 2,285,678 | 6/1942 | Overstrom | 209—315 |
| 2,290,434 | 7/1942 | Johnson | 209—329 |
| 2,327,305 | 8/1943 | Hagenbook | 198—220 |
| 2,684,754 | 7/1954 | Bankauf | 209—365 |
| 2,700,472 | 1/1955 | Carrier | 209—329 |
| 2,725,984 | 12/1955 | Klemevcic | 209—415 |
| 2,965,233 | 12/1960 | Muller | 209—326 |
| 3,003,635 | 10/1961 | Wood | 209—220 |

FOREIGN PATENTS

| | | |
|---|---|---|
| 821,171 | 11/1951 | Germany. |
| 806,441 | 12/1958 | Great Britain. |

HARRY B. THORNTON, *Primary Examiner.*

HERBERT L. MARTIN, *Examiner.*